(12) United States Patent
Bakhir

(10) Patent No.: US 11,858,833 B2
(45) Date of Patent: Jan. 2, 2024

(54) ELECTROCHEMICAL SYSTEM FOR THE SYNTHESIS OF AQUEOUS OXIDISING AGENT SOLUTIONS

(71) Applicant: BLUE SAFETY GMBH, Münster (DE)

(72) Inventor: Vitold Bakhir, Moscow (RU)

(73) Assignee: BLUE SAFETY GMBH, Münster (DE)

( * ) Notice: Subject to any disclaimer, the term of this patent is extended or adjusted under 35 U.S.C. 154(b) by 0 days.

(21) Appl. No.: 17/286,141

(22) PCT Filed: Oct. 18, 2018

(86) PCT No.: PCT/EP2018/078559
§ 371 (c)(1),
(2) Date: Apr. 16, 2021

(87) PCT Pub. No.: WO2020/078553
PCT Pub. Date: Apr. 23, 2020

(65) Prior Publication Data
US 2021/0355589 A1 Nov. 18, 2021

(51) Int. Cl.
*C25B 1/50* (2021.01)
*C02F 1/467* (2023.01)
(Continued)

(52) U.S. Cl.
CPC .............. *C02F 1/4674* (2013.01); *C25B 1/04* (2013.01); *C25B 1/13* (2013.01); *C25B 1/26* (2013.01);
(Continued)

(58) Field of Classification Search
CPC .... C02F 2201/4618; C02F 2201/46185; C02F 1/4674; C02F 2201/46115; C02F 2201/46155; C25B 1/26; C25B 1/46
See application file for complete search history.

(56) References Cited

U.S. PATENT DOCUMENTS 4,119,518 A * 10/1978 Miller ................. C02F 1/46109
204/263
4,256,552 A 3/1981 Sweeney
(Continued)

FOREIGN PATENT DOCUMENTS

| CN | 1084584 A | 3/1994 |
| CN | 1152341 A | 6/1997 |

(Continued)

OTHER PUBLICATIONS

International Search Report dated Jul. 12, 2029, issued in connection with PCT International Application No. PCT/EP2018/078559.
(Continued)

*Primary Examiner* — Zulmariam Mendez
(74) *Attorney, Agent, or Firm* — Norris McLaughlin, P.A.

(57) ABSTRACT

The invention relates to the field of chemical technology and relates in particular to devices for electrolyzing aqueous alkali metal chloride solutions to obtain chlorine, chlorine compounds, oxygen, ozone as well as hydroperoxide compounds and can be used for disinfection in the medical, pharmaceutical and food industries as well as in the purification and sterilization of water by aqueous solutions of hypochlorous and hydroperoxide oxidizing agents.

2 Claims, 1 Drawing Sheet

(51) Int. Cl.
*C25B 9/19* (2021.01)
*C25B 1/04* (2021.01)
*C25B 1/26* (2006.01)
*C25B 1/30* (2006.01)
*C25B 1/13* (2006.01)
*C25B 15/08* (2006.01)
*C25B 1/46* (2006.01)

(52) U.S. Cl.
CPC .............. *C25B 1/30* (2013.01); *C25B 1/46* (2013.01); *C25B 9/19* (2021.01); *C25B 15/083* (2021.01); *C25B 15/085* (2021.01); *C25B 15/087* (2021.01); *C02F 2201/4618* (2013.01); *C02F 2201/46115* (2013.01); *C02F 2201/46155* (2013.01); *C02F 2201/46185* (2013.01)

(56) References Cited

U.S. PATENT DOCUMENTS

| | | | |
|---|---|---|---|
| 5,084,148 A | 1/1992 | Kazcur et al. | |
| 5,354,435 A | 10/1994 | Kaczur et al. | |
| 5,427,658 A | 6/1995 | Allen | |
| 6,428,677 B1 * | 8/2002 | Bonnick | C02F 1/4674 205/498 |
| 7,897,023 B2 | 3/2011 | Bakhir et al. | |
| 9,903,027 B2 | 2/2018 | Manders et al. | |
| 2007/0261954 A1 * | 11/2007 | Bakhir | C25B 1/26 204/260 |
| 2008/0251461 A1 * | 10/2008 | Parker | C02F 1/4676 205/742 |
| 2010/0310672 A1 | 12/2010 | Beltrup et al. | |
| 2011/0303549 A1 | 12/2011 | Manders et al. | |
| 2014/0377131 A1 | 10/2014 | Peters | |
| 2016/0272514 A1 | 9/2016 | Sumita | |
| 2017/0314150 A1 * | 11/2017 | Tseng | C25B 1/26 |
| 2018/0016684 A1 | 1/2018 | Simpson Alvarez | |
| 2018/0171490 A1 * | 6/2018 | Herrington | C02F 1/4674 |
| 2020/0248320 A1 | 8/2020 | Bakhir | |

FOREIGN PATENT DOCUMENTS

| | | |
|---|---|---|
| CN | 101686689 A | 3/2010 |
| CN | 104250827 A | 12/2014 |
| CN | 104903251 A | 9/2015 |
| CN | 105813984 A | 7/2016 |
| CN | 111344437 A | 6/2020 |
| DE | 102015003911 | 9/2016 |
| EP | 0028925 A | 5/1981 |
| EP | 0842122 B1 | 8/2000 |
| RU | 2 509 829 C2 | 3/2014 |
| WO | 2013019004 A2 | 2/2013 |

OTHER PUBLICATIONS

English translation of International Search Report dated Jul. 12, 2029, issued in connection with PCT International Application No. PCT/EP2018/078559.

Written Opinion issued in connection with PCT International Application No. PCT/EP2018/078559.

English translation of Chinese Office Action dated Jan. 12, 2022, in connection with Chinese Patent Application No. 2018800987791.

* cited by examiner

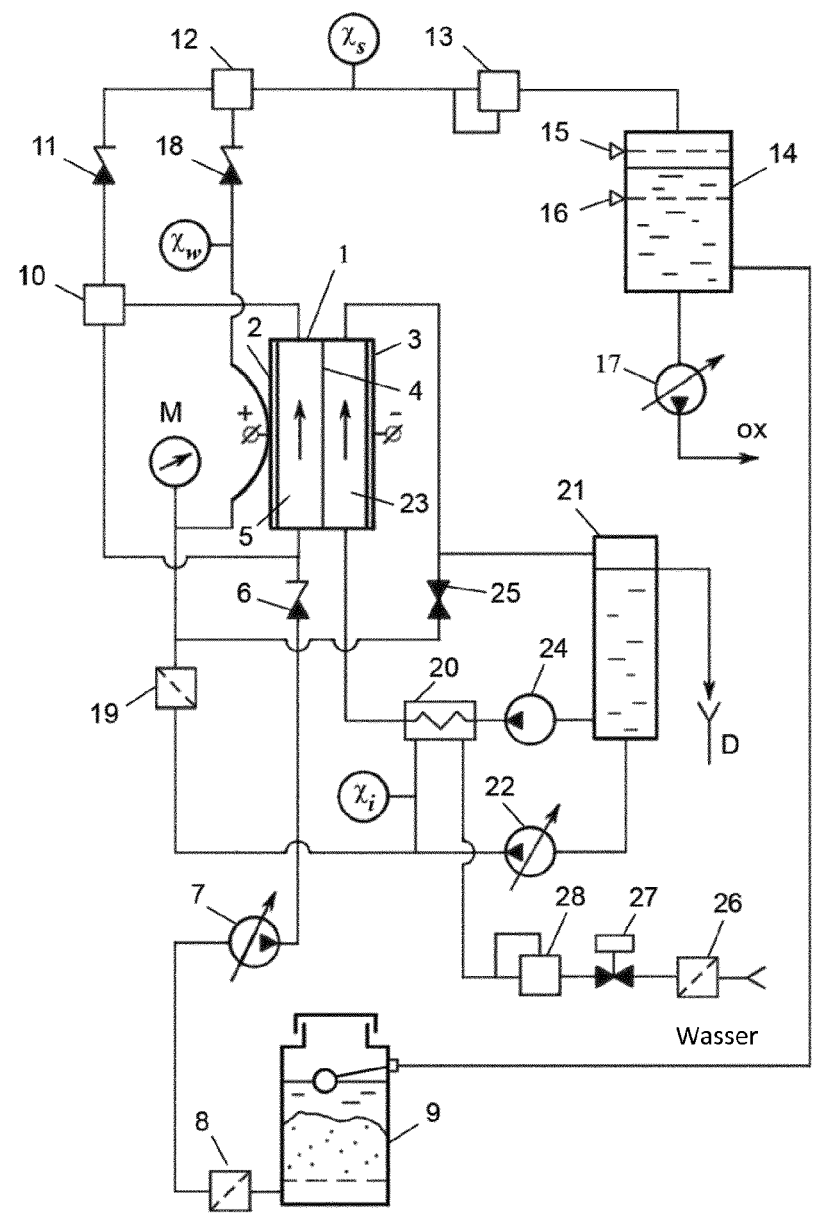

ELECTROCHEMICAL SYSTEM FOR THE SYNTHESIS OF AQUEOUS OXIDISING AGENT SOLUTIONS

This application is the U.S. National Stage of International Application No. PCT/EP2018/078559, filed Aug. 18, 2018.

The invention relates to the field of chemical technology and relates in particular to devices for electrolyzing aqueous alkali metal chloride solutions to obtain chlorine, chlorine compounds, oxygen, ozone as well as hydroperoxide compounds and can be used for disinfection in the medical, pharmaceutical and food industries as well as in the purification and sterilization of water by aqueous solutions of hypochlorous and hydroperoxide oxidizing agents.

The solutions of the hypochlorous and hydroperoxide compounds are obtained in electrolyzing aqueous alkali metal chloride solutions by dissolving products of the anodization of chloride solutions in water, usually sodium chloride solutions, in a membrane or diaphragm method. Conventional processes in the electrolysis of aqueous sodium chloride solutions are the purification of aqueous starting sodium chloride solutions from hardness-forming substances, heavy metals and admixtures of organic compounds, which are without exception found in starting rock salt and are extremely difficult to remove using traditional treatment methods from salt intended for use for example in the food industry. In addition to the main device, the electrolysis apparatus, various auxiliary devices are used for the electrochemical synthesis and are denoted overall "technical electrochemical system". In addition to the actual electrochemical reactor which consists of a membrane or diaphragm electrolysis apparatus with an external separation vessel, heat exchangers, controllers for the pressure and volumetric flow rate of liquids and gases, most technical electrochemical systems comprise additional means for producing and purifying the salt solution from hardness-forming substances, multivalent metal ions, organic admixtures as well as ion exchange or reverse osmosis systems for purifying the water from hardness-forming substances as well as collection vessels for the electrochemical synthesis products, in particular caustic soda and hypochlorite solutions.

A method for obtaining electrolysis products from sodium chloride solutions in a technical electrochemical system is known and described in patent RU 2 509 829 C2.

This method is carried out with the assistance of a technical electrochemical system which, in addition to the membrane electrolysis apparatus, comprises a salt dissolution vessel, the function of which is to combine the processes of salt storage and production of the actual concentrated salt solution, while simultaneously purifying it from hardness-forming substances and multivalent metals by converting the soluble compounds into insoluble hydroxides by the metered introduction of catholyte into the salt solution. In this vessel, the salt solution is purified from organic admixtures by the metered introduction of hydrogen peroxide solution. The technical electrochemical system which implements the claimed method likewise includes an activated carbon filter and a filter with ion-exchange resin for removing residual quantities of multivalent cations, which filters are arranged in series in the feed line for the salt solution to the electrolysis apparatus. Downstream from the ion-exchange filter, hydrochloric acid is metered into the feed line feeding the salt solution to the electrolysis apparatus in order to prevent any harmful effect of the hypercaustic salt solution on the anode coating and to reduce unproductive electricity consumption for oxidizing the hydroxide ions and the mass transfer of monovalent sodium cations through the membrane into the cathode compartment.

One disadvantage of the technical solution according to patent RU 2 509 829 C2 is the necessary use of various additional reagents for reprocessing the ion-exchange filter, for oxidizing the organic compounds in the salt solution, and for correcting the pH of the salt solution entering the anode compartment of the electrolysis apparatus, as well as in the necessary periodic replacement of the carbon filter bed. In this respect, this electrochemical system requires frequent maintenance, constant monitoring, and correction of its operating parameters.

The device selected as a prototype according to patent U.S. Pat. No. 7,897,023 B2 comes closest to the technical essence and the result to be achieved. This device is an electrochemical system comprising a diaphragm electrolysis apparatus with a tubular ceramic ultrafiltration diaphragm, with a catholyte and anolyte circulation circuit, with corresponding separation vessels for separating electrolysis gases and with heat exchanger devices for cooling the catholyte and anolyte, a device consisting of a metering pump with salt dissolution vessel for feeding the purified salt solution under pressure into the anode compartment, a device for dissolving the moist gaseous products of the electrochemical anode reactions in the water stream to obtain the oxidizing agent solution, a device for stabilizing the overpressure in the anode compartment, a collection vessel for the oxidizing agent solution and a means for metered introduction of catholyte from the separation vessel of the cathode circuit into the oxidizing agent solution to be synthesized.

One disadvantage of this device is that multivalent ions, including heavy metal ions, are present in the finished product, i.e. in the solution of hypochlorous and hydroperoxide oxidizing agents in water. These ions commonly occur in drinking water or natural fresh water which is used for producing the initial salt solution and for obtaining the oxidizing agent solution by dissolving the gaseous products of the electrochemical anode reactions in the fresh water stream, which gaseous products contain microdroplets of moisture with singlet oxygen, ozone and hydrogen peroxide dissolved therein. Multivalent metal ions, and in particular heavy metal ions, are known to be catalysts for the chemical decomposition of active chlorine and active oxygen compounds—hypochlorous acid and hydrogen peroxide. For this reason, the oxidizing agent solutions produced in this device lose their bioactivity within a few days as a result of spontaneous decomposition under the action of catalytically active ions. A further disadvantage of this technical solution is the necessary periodic purification of the electrode compartments of the electrochemical reactor from oxidized organic compounds of various kinds, which may be present in small amounts in the rock salt used to produce the initial salt solution and in the water downstream from the device for water softening with ion-exchange resins. In the interval between the purification processes of the electrochemical reactor, it is necessary periodically to change the set operating parameters of the electrochemical system, by adapting them to the operating conditions which deteriorate over time due to the formation of deposits in the electrochemical reactor. These operations require time and attention from the operating personnel for all peripheral devices which are component parts of the integrated technical electrochemical system for synthesizing the oxidizing agent solution: for the water softener, for the device for producing salt solution and for the regulating devices.

The object of the invention is to extend the time over which the biocidal properties of the final product, the oxidizing agent solution, are retained, by purifying the water from hardness-forming substances and multivalent metal ions as well as the time for continuous or repeated short-term operation of the electrochemical system between maintenance operations, without the operating parameters thereof having to be corrected due to the purification of the salt solution from organic admixtures and completely avoiding the consumption of additional chemical reagents.

The technical result of the invention is achieved in that, unlike in known technical solutions, a filter is arranged on entry of water into the device for mixing the fresh water stream with the gaseous oxidizing agents, upstream of which filter a means for metered introduction of the catholyte from the separation vessel of the cathode circuit into the water stream is installed on the fresh water feed line and the salt is dissolved in the device for feeding the salt solution into the anode compartment using the means for metered introduction of the oxidizing agent solution from the collection vessel into the vessel of the salt solution device, at the outlet of which a filter is arranged which is connected with the inlet of the metering pump for feeding the salt solution under pressure into the anode compartment of the electrolysis apparatus.

FIG. 1 shows the basic hydraulic circuit diagram of the electrochemical system for synthesizing the oxidizing agent solution from alkali metal chlorides, preferably sodium chloride.

The electrochemical system contains a diaphragm electrolysis apparatus—electrochemical reactor (1) with coaxially arranged electrodes—of the anode (2), the cathode (3) and the diaphragm (4). The process engineering diagram of anode synthesis of the oxidizing agents consists of the anode compartment (5) of the reactor (1), the inlet of which is connected via the non-return valve (6) to the outlet of the high-pressure metering pump (7), the inlet of which is in turn connected to the filter (8), which is connected to the vessel for dissolving the salt (9), in which the initial salt solution is produced and purified. The outlet of the anode compartment (5) is connected to the separation vessel (10) for separating the gaseous products of the electrochemical anode reactions from the anolyte. The outlet in the lower part of the separation vessel (10) is connected to the inlet of the anode compartment (5) of the electrochemical reactor (1), wherein the anode circuit of the anolyte is thereby closed. The outlet in the upper part of the separation vessel (10) is connected via the non-return valve (11) to the device (12) for dissolving the gaseous products of the electrochemical anode reactions in fresh water. The outlet of the device (12) is connected to the upstream pressure regulator (13), which, during operation of the electrochemical system, ensures that the pressure in the anode circuit of the electrochemical reactor (1) constantly exceeds the pressure in the cathode circuit by building up a regulated predetermined hydraulic resistance in the oxidizing agent solution stream. In the hydraulic line connecting the outlet of the device (12) to the upstream pressure regulator (13), a measurement sensor is arranged for the conductivity capacity of the oxidizing agent solution "$\chi_s$". The outlet of the upstream pressure regulator (13) is connected to the inlet of the collection vessel for the oxidizing agent solution (14), which is provided with measurement sensors for the permissible maximum (15) and minimum (16) oxidizing agent solution levels.

One of the outlets of the collection vessel for the oxidizing agent solution (14) is connected to the inlet of the vessel (9) for producing and purifying the salt solution, which is located lower than the collection vessel of the oxidizing agent solution (14). The other outlet of the vessel (14) is connected to the inlet of the metering pump (17), which latter is intended for feeding the oxidizing agent solution to the object of use, for example to the point of introduction of the oxidizing agent into the water mains for the purification of drinking water.

The water arrives in the device (12) for dissolving the gaseous products of the electrochemical anode reactions via the non-return valve (18) and the heat-exchange system of the anode circuit of the electrochemical reactor (1) from the outlet of the filter (19). In the hydraulic line connecting the outlet of the heat-exchange system of the anode circuit of the electrochemical reactor (1) and the inlet of the non-return valve (18), a measurement sensor is arranged for the conductivity capacity of the water "$\chi_w$". The water which has flowed through the heat-exchange device (20) of the cathode circulation circuit is fed, with the addition of catholyte from the separation circulation vessel of the catholyte (21), to the inlet of the filter (19). The catholyte is introduced into the water stream at the outlet from the heat-exchange device of the cathode circulation circuit (20) by means of metering pump (22). In the hydraulic line connecting the outlet of the water and the inlet of the filter (19), a measurement sensor for the conductivity capacity of the outlet water "$\chi_i$" is arranged upstream of the point of introduction of the catholyte from the separation/circulation vessel of the catholyte (21). Apart from the heat-exchange device (20) for cooling the catholyte and apart from the separation/circulation vessel of the catholyte (21), the cathode circuit of the catholyte comprises the cathode compartment (23) of the electrochemical reactor (1), the circulating pump (24) and the valve (25) for filling the separation/circulation vessel of the catholyte (21) on start-up of the system and supplying purified water on operation of the system. The separation/circulation vessel of the catholyte (21) is provided with an outflow line of the catholyte which forms during operation of the system. The water is fed to the electrochemical system for synthesis of the oxidizing agent solution from the pressurized water supply network via the coarse filter (pre-filter) (26), the solenoid valve (27) and the downstream pressure regulator (28).

The electrochemical system for synthesizing the oxidizing agent solution functions as follows.

On initial start-up of the electrochemical system (no water or solutions in the system), the vessel (9) is filled with rock salt in the quantity needed for synthesis of the predetermined quantity of oxidizing agent solution, in the maximum consumption ratio of 0.8 gram of salt per 1 liter of oxidizing agent solution. For the production, for example, of 25,000 liters of oxidizing agent solution with a concentration of active substances (hypochlorous and hydroperoxide compounds) of 500 mg/l, the vessel (9) needs to be filled with 20 kilograms of salt. The vessel (9) is filled with softened, purified water, wherein the salt must be completely covered with water. This takes place once, on initial start-up of the system. The port for feeding water to the inlet of the mechanical filter (26) is connected to the pressure line for the fresh water (drinking water). The normally closed solenoid valve (27) is supplied with power by means of a separate switch. The predetermined volumetric flow rate of the water through the system and the predetermined pressure in the anode circuit are adjusted by a downstream pressure regulator (28) and an upstream pressure regulator (13), in accordance with the readings of the manometer M and the external flow meter (not shown on the drawing).

Using the valve (25), the separation vessel of the catholyte (21) is filled with water until a water jet exits from the outflow line of the separation vessel (21), the valve is then brought into a position which ensures that water is fed into the separation circulation vessel for the catholyte (21) at a rate of 20-30 drops per minute (determined on the basis of the rate of impingement of drops from the outflow line of the separation vessel for the catholyte (21)). The metering pump (7) is switched on and the anode compartment (5) of the electrochemical reactor (1) is filled with salt solution from the vessel (9). The end of the filling process is established on the basis of an increase in measurement sensor values for the conductivity capacity of the oxidizing agent solution "$\chi_s$" by roughly twice the measurement sensor values for the conductivity capacity of the water "$\chi_w$". Open-loop control of the electrical devices of the system (pumps, power source of the electrochemical reactor) is switched to the automatic control block (not shown on the drawing), which is connected to the measurement sensors for the level of oxidizing agent solution in the collection vessel (14) and the measurement sensors for the conductivity capacity of the conditioned, softened water "$\chi_w$", the oxidizing agent solution "$\chi_s$" and the outlet water "$\chi_i$". In the case of a level of oxidizing agent solution in the collection vessel (14) below the measurement sensor (16) or between the measurement sensors (16) and (17), the power source of the electrochemical reactor (not shown on the drawing), the catholyte circulating pump (24), the pump (22) for metered introduction of the catholyte into the fresh water stream and the metering pump (7) for feeding the salt solution into the anode compartment (5) of the electrochemical reactor (1) are switched on. The automatic control block controlling the electrical devices of the electrochemical system ensures closed-loop control of the rate of feed of catholyte by the metering pump (22) into the outlet fresh water on the basis of the signals from the measurement sensor for the conductivity capacity of the water "$\chi_w$" and "$\chi_i$" by maintaining the conductivity capacity of the water downstream of the filter (19), which is to be kept by the measurement sensor for the conductivity capacity "$\chi_w$" at the predetermined value of the measurement range determined by the ratio $\chi_w=(1.0\text{-}1.5)\ \chi_i$. The automatic control block likewise ensures closed-loop control of the rate of feed of the salt solution by the metering pump (7) into the anode compartment (5) of the electrochemical reactor (1) on the basis of the signals from the measurement sensor for the conductivity capacity "$\chi_w$" and "$\chi_s$" by maintaining the conductivity capacity of the oxidizing agent solution "$\chi_s$" at the predetermined value of the measurement range determined by the ratio $\chi_s=(1.5\text{-}2.5)$ km.

During plant operation, the following reactions take place in the electrochemical reactor (1).

The main reaction in the electrochemical reactor (1) is the liberation of molecular chlorine in the anode compartment (5) and the formation of sodium hydroxide in the cathode compartment (23):

$$NaCl+H_2O-e \rightarrow NaOH+0.5H_2+0.5Cl_2.$$

At the same time, chlorine dioxide is synthesized with lower current efficiency in the anode compartment directly from the salt solution and the hydrochloric acid which forms in the vicinity of the anode on dissolution of the molecular chlorine ($Cl_2+H_2O \leftrightarrow HOCl+HCl$):

$$2NaCl+6H_2O-10e \rightarrow 2ClO+2NaOH+5H_2;$$

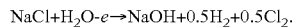

In the anode compartment of the reactor, ozone is formed by direct water decomposition and by oxidation of the liberated oxygen:

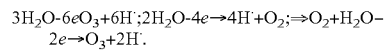

The active oxygen compound formation reaction proceeds at low current efficiency:

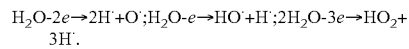

Current efficiency for the formation of chlorine dioxide, ozone, singlet oxygen and hydrogen peroxide rises as the mineral content of the initial aqueous sodium chloride solution falls, reaching 20-30% at a salt concentration in the initial solution in the range 80-150 g/l at an anode density of five to seven thousand amperes per square meter (5000-7000 $A/m^2$). Once the salt content in the initial solution has increased to 250-300 g/l, the current efficiency of the chlorine dioxide, ozone, singlet oxygen and hydrogen peroxide formation reaction falls to 1-2% at an anode density of 5000-7000 $A/m^2$ and to 0.1-0.2% at an anode density of 2000-3000 $A/m^2$.

Dissolution of the gaseous product of the anodization of the sodium chloride solution in water generally proceeds in a reaction expressed by the following equation:

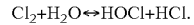

Hypochlorous acid, the content of which in the solution is limited by the decreasing pH as a result of the formation hydrochloric acid, is known to be a fundamental antimicrobial agent. pH can be modified by introducing alkali metal hydroxide solution, i.e. for example sodium hydroxide. However, this results in the formation of products which are unwanted (sodium chloride) and sparingly reactive (sodium hypochlorite). Sodium hypochlorite as the salt of a weak acid (hypochlorous acid) and a strong base (sodium hydroxide) has 250 to 350 times lower antimicrobial activity than hypochlorous acid.

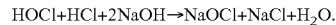

In the event of simultaneous increase in the pH of the oxidizing agent solution with simultaneous increase in the concentration of the hypochlorous acid and removal of the hardness-forming substances and the multivalent metal ions, including iron, the formation of sodium hypochlorite may be avoided by introducing a catholyte containing free hydroxyl groups into the water stream.

The catholyte is known to have extraordinarily high chemical adsorption activity in hydrate formation reactions. The elevated reactivity of the catholyte can be explained, among other things, by the large quantity of free hydroxyl groups and dissolved hydrogen present in the catholyte.

Interaction of the catholyte and electrolytes present in the water results in the formation of water-insoluble compounds:

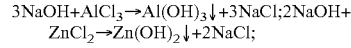

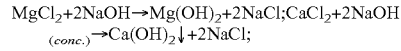

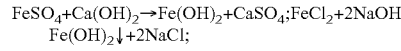

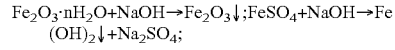

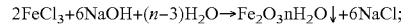

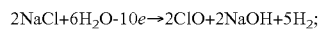

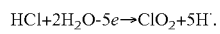

$Al_2(SO_4)_3 + 6NaOH_{dil.} \rightarrow 2Al(OH)_3\downarrow + 3Na_2SO_4$;

$AlCl_3 + 3NaOH \rightarrow Al(OH)_3\downarrow + 3NaCl$.

The hydroxides and the flocs formed, particle aggregates of the hydroxides with the adsorbed molecules of organic compounds, the microcolloidal particles and hydrogen bubbles are deposited on the filter (19) and the softened water purified from multivalent metal cations, which has a low concentration of dissolved hydrogen and free hydroxyl groups, flows into the device for dissolving the oxidizing agents (12) which bring about an increase in the concentration of hypochlorous acid in the oxidizing agent solution according to the following reaction: $Cl_2 + H_2O + O^- \leftrightarrow 2HOCl$.

Depending on the quantity collected in the vessel (14) of the electrochemical system, the oxidizing agent solution is likewise used, apart from for its main purpose, in small quantities as an agent for dissolving the salt in the vessel (9), which oxidatively decomposes the organic admixtures which are originally present in the rock salt and are difficult to remove in conventional methods for producing salt for household use and numerous industrial applications. The oxidized and coagulated foreign organic compounds are retained by the filter (8) at the outlet from the vessel (9). Dissolving the salts with the oxidizing agent solution makes it possible to ensure the microbiological purity of the agent in the salt dissolution vessel. As a consequence, it no longer has to be regularly maintained until the end of the process of dissolving the entire introduced quantity of salt. Prior to feeding into the anode compartment of the electrochemical reactor, there is no need to remove the multivalent metal ions, including heavy metal ions, from the salt solution. All the metal cations which enter the anode compartment as part of the salt solution under the effect of the pressure gradient and the electrical field are removed together with the liquid filter stream into the cathode compartment by means of the porous UV medium of the ceramic diaphragm. In the cathode compartment, the multivalent metal cations are converted into hydroxides and removed from the system via the outflow line from the catholyte separation circulation vessel (21).

The electrochemical system was tested comparatively against the prototype of the device constructed according to patent U.S. Pat. No. 7,897,023 B2 and supplemented with an ion exchanger (water softener) and a vessel for dissolving the salt and for producing a salt solution. To permit a more accurate comparative analysis, the water from the ion-exchange softener was used not only to produce the salt solution but also to dissolve the gaseous products of the anode compartment of the electrochemical reactor. The ion-exchange softener was connected to the drinking water pressure line. The device according to the US patent was likewise supplemented with a collection vessel for the oxidizing agent solution. The two comparable systems contained an electrochemical reactor consisting of four electrochemical modular elements (cells) according to patent EP 0 842 122 B1. The aqueous initial salt solution contained 250 g/l sodium chloride, the content of hardness-forming substances in the initial solution was 0.3 mg-eq/l (1 since it corresponds to 0.3566 mg-eq/l in the electrochemical system according to patent U.S. Pat. No. 7,897,023 B2 and 4.5 mg-eq/l in the vessel (9) of the system according to the new technical solution. The reason for the difference was the low content of hardness-forming substances in the water downstream of the ion-exchange softener and the significantly higher content of hardness-forming substances in conventional mains drinking water from which the initial salt solution was originally produced in the electrochemical system according to the new technical solution. The current intensity through the electrochemical reactor in the prototype device was 40 amperes at a voltage of 5 volts. The same values were set for the electrochemical reactor in the electrochemical system according to the new technical solution. 52 g/h of oxidizing agent were accordingly produced in each of the comparison systems. The oxidizing agent solution, which was produced in the prototype system at a rate of 100 l/h, had an oxidizing agent concentration of 500 mg/l, a pH of 2.8 and a total mineral content of 0.86 g/l. The content of hardness-forming substances in the oxidizing agent solution was 0.2 mg-eq/l. On metered introduction of the catholyte which forms during synthesis of the oxidizing agent solution, the pH of the solution at the outlet rose to 6.0 with a simultaneous increase in the mineral content of the solution to 1.5 g/l. The oxidizing agent solution, which is produced at a rate of 100 l/h in the device according to the new technical solution, had a pH of 3.0 at an oxidizing agent concentration of 500 mg/l and a total mineral content of 0.66 g/l. On metered introduction of catholyte into the initial water, the pH of the oxidizing agent solution rose with a simultaneous increase the mineral content to 0.82 g/l. The hardness of the oxidizing agent solution was in the region of 0.8 mg-eq/l, but decreased over the course of 2 hours' operation to 0.6 mg-eq/l. Evaluation of the results of these investigations shows that the introduction of catholyte upstream of the filter (19) substantially reduces the hardness of the water for dissolving the gaseous products of the anodization of the sodium chloride solution and that the introduction of the oxidizing agent solution with a reduced content of hardness-forming substances in the vessel (9) for producing the salt solution substantially reduces the content of hardness-forming substances in the oxidizing agent solution.

The two systems each ran continuously for 10 hours daily for 10 days. Samples of the oxidizing agent solutions were taken twice: at the end of the second day of operation of the comparable electrochemical systems (20 hours of operation) and after 10 days (100 hours of operation). The solution from the prototype system exhibited the following values after twenty hours of system operation: pH 6.4; oxidizing agent concentration 480 mg/l; mineral content 1.4 g/l. After ten days, the oxidizing agent concentration in the sample taken (quantity of solution 1 liter) fell to 460 mg/l. The content of hardness-forming substances in the oxidizing agent solution of the prototype was 0.9 mg-eq/l, i.e. the performance of the ion-exchange filter had deteriorated. The solution from the system according to the new technical solution exhibited the following values after 20 hours of system operation: pH 5.9; oxidizing agent concentration 510 mg/l; total mineral content 0.83 g/l. After 10 days, the oxidizing agent concentration in the sample taken (solution sample) was unchanged. The content of hardness-forming substances in the oxidizing agent solution of the prototype was 0.6 mg-eq/l, i.e. the introduction of catholyte into the initial water upstream of the filter allowed purification of the water from hardness-forming substances. The oxidizing agents thus remained in the solution for longer.

The solution from the prototype system exhibited the following values after one hundred hours of system operation: pH 6.3; oxidizing agent concentration 470 mg/l; total mineral content 1.4 g/l. After 10 days, the oxidizing agent concentration in the sample taken (quantity of solution 1 liter) fell to 440 mg/l. The content of hardness-forming substances in the oxidizing agent solution of the prototype was 3.8 mg-eq/l, which is obviously related to the significant deterioration in the performance of the ion-exchange filter.

The solution from the system according to the new technical solution exhibited the following values after one hundred hours of operation: values: pH 5.9; oxidizing agent concentration 500 mg/l; total mineral content 0.83 g/l. After 10 days' operation, the oxidizing agent concentration in the sample taken (solution sample) was unchanged. The content of hardness-forming substances in the oxidizing agent solution from the system according to the new technical solution was 0.6 mg-eq/l, i.e. the introduction of catholyte into the initial water upstream of the filter allowed effective purification of the water from hardness-forming substances for an extended period. As a result, the oxidizing agents remained in the solution for longer. Examination of the vessel for dissolution of the salt and the production of the salt solution revealed a biofilm of microorganisms in the vessel of the prototype system. Biofilm was completely absent from the vessel (9) of the system according to the new technical solution. This fact is extremely important because, when oxidized in the anode compartment of the electrochemical reactor, the organic substances formed during the activity of the biofilm are capable of having a negative impact on the electrolytic decomposition of the sodium chloride due to the formation of difficult-to-remove impurities on the electrodes and the diaphragm (membrane).

REFERENCE SIGNS 1 reactor
2 anode
3 cathode
4 diaphragm
5 anode compartment
6 non-return valve
7 high-pressure metering pump
8 filter
9 salt
10 separation vessel
11 non-return valve
12 device
13 upstream pressure regulator
14 oxidizing agent solution
15 maximum level
16 minimum level
17 metering pump
18 non-return valve
19 filter inlet
20 heat-exchange device
21 Catholyte
22 metering pump
23 cathode compartment
24 circulating pump
25 valve
26 coarse filter (pre-filter)
27 solenoid valve
28 downstream pressure regulator

The invention claimed is:

1. An electrochemical system for synthesizing an oxidizing agent solution from fresh water and sodium chloride, the electrochemical system comprising:
a diaphragm electrolysis apparatus comprising an anode compartment, a cathode compartment, and a tubular ceramic ultrafiltration diaphragm;
a cathode circuit for a catholyte comprising a separation vessel for separating an electrolysis gas produced in the cathode compartment from the catholyte and a heat exchanger device for cooling the catholyte;
an anode circuit for an anolyte comprising a separation vessel for separating an electrolysis gas produced in the anode compartment from the anolyte and a heat exchanger device for cooling the anolyte;
a device for feeding an aqueous sodium chloride solution into the anode compartment of the diaphragm electrolysis apparatus under pressure, said device comprising a first metering pump and a vessel for dissolving the sodium chloride;
a device for stabilizing an overpressure in the anode compartment;
a filter arranged in a feed line feeding the fresh water to the device for dissolving the electrolysis gas produced in the anode compartment; and
a second metering pump for metered feed of the catholyte from the separation vessel of the cathode circuit into the stream of the fresh water upstream of the filter,
a collection vessel for an oxidizing agent solution, the oxidizing agent solution being a solution of catholyte supplied to the fresh water by the second metering pump and electrolysis gas produced in the anode compartment dissolved in the fresh water;
wherein the device for feeding the aqueous sodium chloride solution into the anode compartment further comprises a third metering pump means for metered feeding of the oxidizing agent solution from the collection vessel for the oxidizing agent solution into the vessel for dissolving the sodium chloride and a filter arranged at an outlet of the vessel for dissolving the sodium chloride and connected to an inlet of the metering pump for feeding the sodium chloride solution under pressure into the anode compartment of the electrolysis apparatus.

2. A process for synthesizing an oxidizing agent solution from fresh water and sodium chloride using a diaphragm electrolysis apparatus comprising an anode compartment, a cathode compartment, and a tubular ceramic ultrafiltration diaphragm, the process comprising:
feeding an aqueous sodium chloride solution from a vessel for dissolving the sodium chloride into the anode compartment of the diaphragm electrolysis apparatus under pressure;
circulating an anolyte in an anode circuit comprising a separation vessel for separating an electrolysis gas produced in the anode compartment from the anolyte;
circulating a catholyte in a cathode circuit comprising a separation vessel for separating an electrolysis gas produced in the cathode compartment from the catholyte;
metered feeding of the catholyte from the separation vessel of the cathode circuit into a stream of the fresh water,
subjecting the stream of the fresh water supplied with the catholyte to a filtering process;
dissolving the electrolysis gas produced in the anode compartment with the filtered stream of the fresh water supplied with the catholyte to obtain the oxidizing agent solution;
collecting the oxidizing agent solution in a collection vessel; and
metered feeding of the oxidizing agent solution from the collection vessel into the vessel for dissolving the sodium chloride.

* * * * *